United States Patent
Lee

(10) Patent No.: US 6,405,822 B1
(45) Date of Patent: Jun. 18, 2002

(54) TORQUE DISTRIBUTION SYSTEM FOR FOUR-WHEEL-DRIVE VEHICLE

(75) Inventor: Tae-Hyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/718,698

(22) Filed: Nov. 21, 2000

(30) Foreign Application Priority Data

Nov. 22, 1999 (KR) .............................. 99-51897

(51) Int. Cl.⁷ ..................... B60K 23/08; B60K 17/342
(52) U.S. Cl. ................. 180/251; 192/66.23; 180/247
(58) Field of Search .................... 192/66.23, 66.21, 192/93 A, 103 R, 69.43; 180/233, 247, 251

(56) References Cited

U.S. PATENT DOCUMENTS

| | | | | |
|---|---|---|---|---|
| 2,116,739 A | * | 5/1938 | Eason | |
| 2,344,593 A | * | 3/1944 | Brownlee | |
| 2,756,854 A | * | 7/1956 | Brenholts | |
| 2,821,096 A | * | 1/1958 | Lyeth, Jr. | |
| 2,831,352 A | * | 4/1958 | Elliott et al. | |
| 3,572,165 A | * | 3/1971 | Roper | |
| 5,620,072 A | * | 4/1997 | Engle | 192/35 |

FOREIGN PATENT DOCUMENTS

JP 2000-326749 * 11/2000

* cited by examiner

Primary Examiner—Avraham Lerner
(74) Attorney, Agent, or Firm—Christie, Parker & Hale, LLP

(57) ABSTRACT

A torque distribution system for four-wheel-drive vehicle includes an idle gear mounted on one of a front or rear propeller shaft, a transfer gear mounted on the other propeller shaft, a chain connecting the idle gear and the transfer gear, a clutch coaxially mounted with the idle gear on the propeller shaft where the idle gear is mounted, and a clutch controller for selectively engaging the clutch. The clutch includes an external drum integrally fixed to the idle gear and having an inner circumferential friction plane, and an internal drum slidably mounted on the propeller shaft and having an outer circumferential friction plane such that the internal drum selectively slides into and engages with the external drum.

9 Claims, 3 Drawing Sheets

TORQUE DISTRIBUTION SYSTEM FOR FOUR-WHEEL-DRIVE VEHICLE

BACKGROUND OF THE INVENTION (a) Field of the Invention

The present invention relates to an automotive torque distribution system, and in particular, to a torque distribution system capable of distributing engine torque to front and rear wheels without using a multi-disc clutch.

(b) Description of the Related Art

FIG. 1 shows a conventional torque distribution system including a rear propeller shaft 10 connected to a transmission (not shown), a front propeller shaft 20, and a torque transfer device 30 interposed between the rear and front propeller shafts 10 and 20.

The torque transfer device 30 comprises a transfer clutch 15 and an idle gear 12 integrally mounted on the rear propeller shaft 10, a transfer gear 22 mounted on the front propeller shaft 20, and a chain 31 connecting the idle gear 12 and the transfer gear 22. The transfer clutch 15 is engaged in order to fix the idle gear 12 to the rear propeller shaft 10 when there is a rotational speed difference between the front and rear wheels such that a portion of the driving torque of the rear propeller shaft 10 is delivered to the front propeller shaft 20 via the chain connection.

The rotational difference between the front and rear wheels is computed by a controller (not shown) on the basis of parameters detected by rear and front wheel speed sensors 19 and 29 such that the controller responsively generates and sends a control signal to an actuator 18 for engaging or disengaging the transfer clutch 15.

However, since the conventional torque distribution system adopts a multi-disc clutch, this increases the number of parts of the system assembly as well as the vehicle weight.

SUMMARY OF THE INVENTION

The present invention has been made in an effort to solve the above problems of the prior art.

It is an object of the present invention to provide a torque distribution system capable of contributing to the lightening of a vehicle weight and reducing the number of assembly parts of the system by replacing the multi-disc clutch with a simple friction clutch.

To achieve the above object, a torque distribution system for a four-wheel-drive vehicle comprises an idle gear mounted on one of a front or rear propeller shaft, a transfer gear mounted on the other propeller shaft, a chain connecting the idle gear and the transfer gear, a clutch coaxially mounted with the idle gear on the propeller shaft where the idle gear is mounted, and means for controlling the clutch so as to selectively engage and disengage the clutch. The clutch comprises an external drum integrally fixed to the idle gear and having an inner circumferential friction plane and an internal drum slidably mounted on the propeller shaft, and an outer circumferential friction plane such that the internal drum selectively slides into and engages with the external drum.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described hereinafter with reference to the accompanying drawings.

Figure 1:
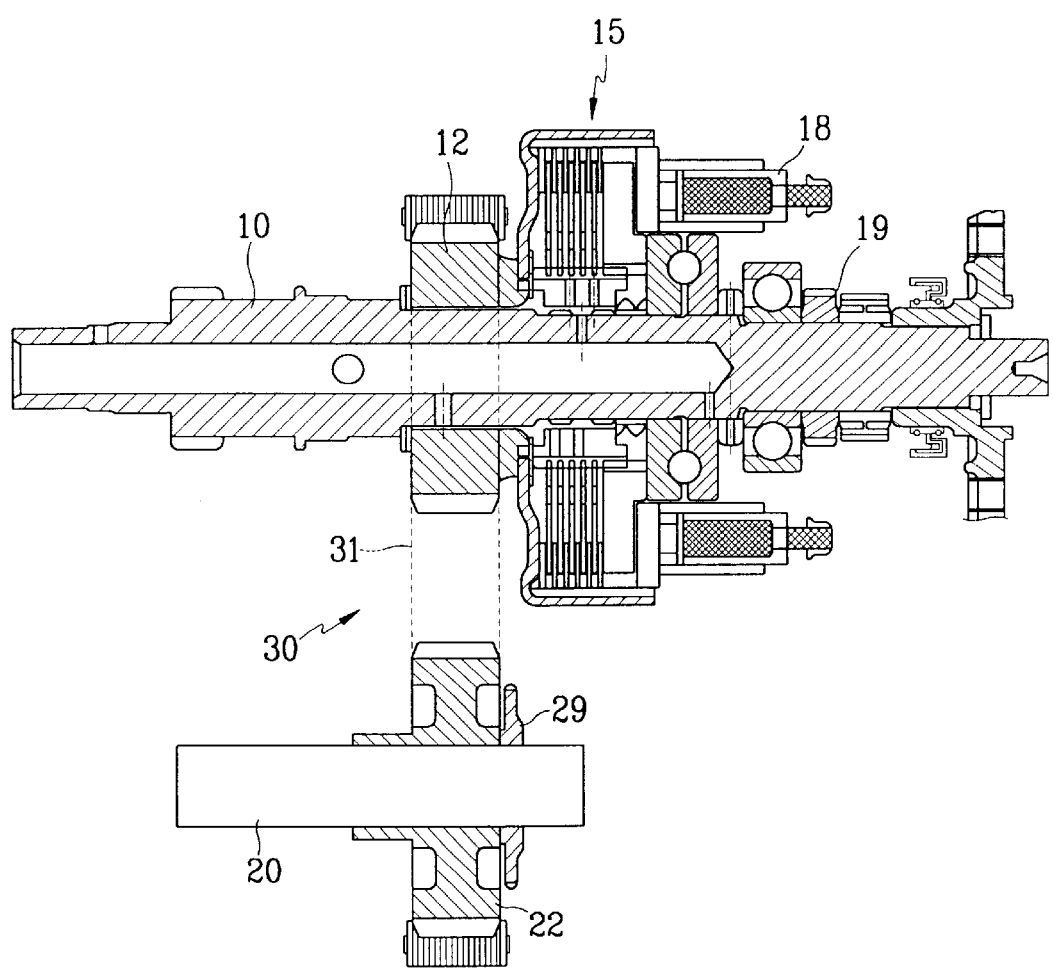
FIG. 1 is a sectional view of a prior art torque distribution system.
Figure 2:
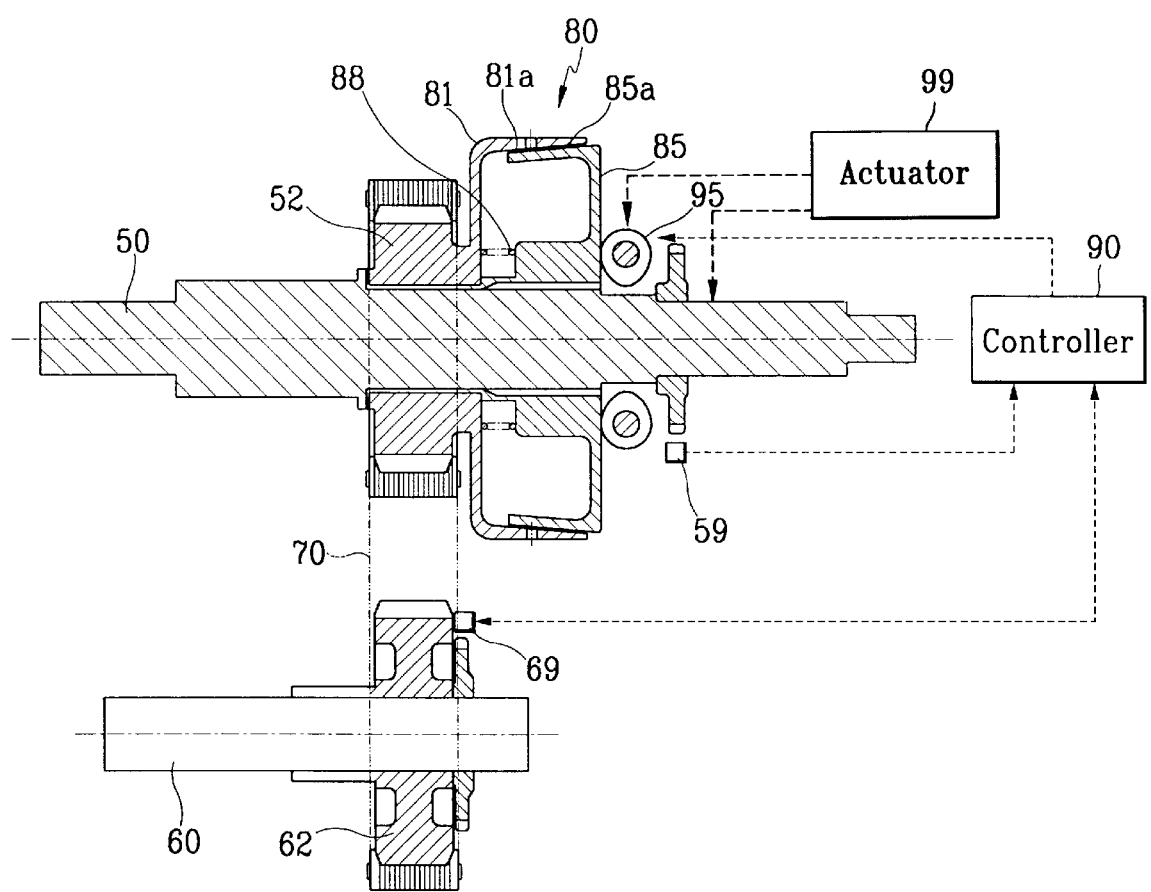
FIG. 2 is a sectional view of a torque distribution system according to a preferred embodiment of the present invention.

FIG. 2 shows the torque distribution system according to the preferred embodiment of the present invention.

As shown in FIG. 2, the torque distribution system of the present invention comprises an idle gear 52 mounted on a rear propeller shaft 50, a transfer gear 62 fixedly mounted on a front propeller shaft 60, a chain 70 which connects the idle gear 52 with the transfer gear 62, a clutch 80 coaxially connected to the idle gear 52 on the rear propeller shaft 50, and a clutch controller for controlling the clutch 80.

The clutch 80 comprises an external drum 81 opened at one side and coaxially fixed to the idle gear 52, an internal drum 85 opened oppositely to the external drum 81 and mounted on the rear propeller shaft 50 by a spline so as to slide on the rear propeller shaft 50, and a return spring 88 interposed between the external and internal drums 81 and 85 for biasing the internal drum 81.

The external drum 81 has an internal friction plane 81a formed on its inner circumferential wall, and the internal drum 85 has an external friction plane 85a formed on its outer circumferential wall. The circumferential wall of the external drum 81 is tapered to become thinner toward the open edge, such that the circumferential wall of the internal drum 85, which is formed at a predetermined angle such that the circumference of the open edge is smaller than the circumference at the closed edge, selectively slides into and fits with the external drum 81.

The clutch controller comprises speed sensors 59 and 69 respectively mounted on the rear and front propeller shafts 50 and 60, a pair of cams 95 rotatably mounted to. a transfer case (not shown) and contacting the internal drum 85 at the side opposite the return spring 88 such that the radial portions of the cams 95 are fitted against the internal drum 85, and a controller 90 electrically connected to the speed sensors 59 and 69 and an actuator (not shown) for actuating the cams 95. The cams 95 are operated by the actuator that is controlled by the controller 90 so as to push the internal drum 85.

In this embodiment of the present invention, the idle gear 52 and clutch 80 are mounted on the rear propeller shaft 50, although they can also be mounted on the front propeller shaft 50. In addition, the means for actuating the internal drum 85 is not limited to the cams 95 but other well-known devices such as electromagnetic actuators or hydraulic actuators can be used.

Figure 3:
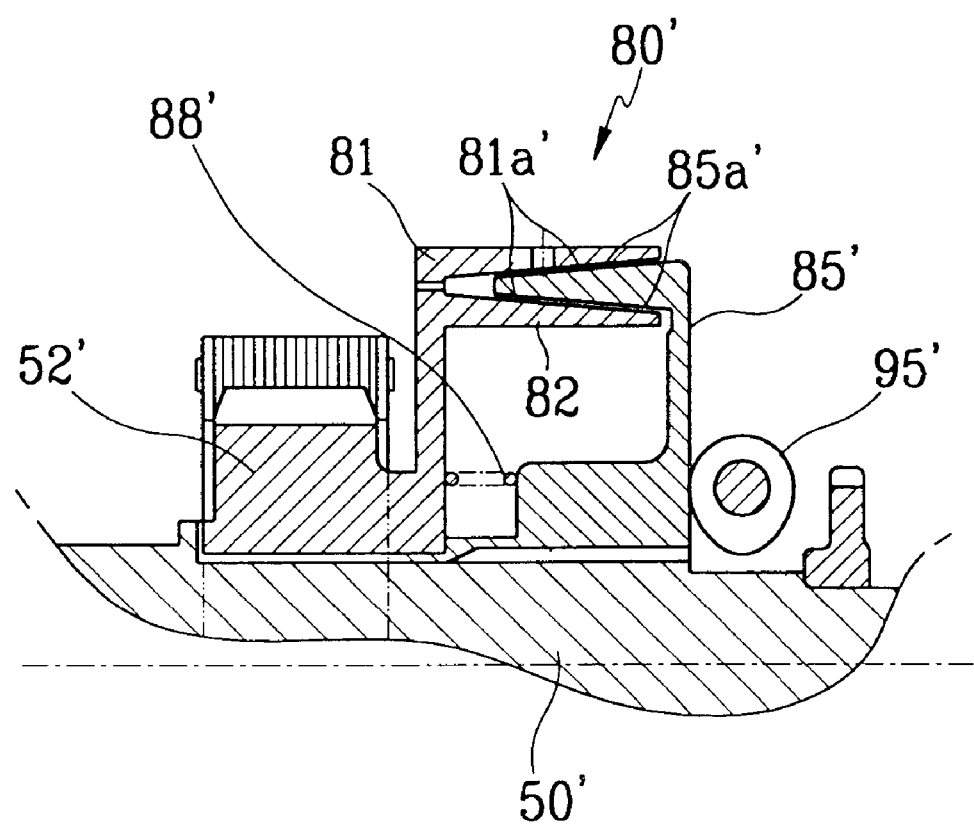
FIG. 3 is a partial sectional view of a torque distribution system according to another preferred embodiment of the present invention.

FIG. 3 shows a part of the clutch 80' according to a second preferred embodiment of the present invention.

As shown in FIG. 3, the external drum 81 further comprises an inner plate 82 having a friction plane 81a' formed on the upper surface of the inner circumferential plate 82 such that the clutch 80' can obtain greater friction force than the clutch 80 having just one friction plane 81a when the external and internal drums 81' and 85' are engaged to each other.

The operation of the torque distribution system of the present invention will be described hereinafter.

The rear and front propeller shafts 50 and 60 rotate by engine torque from a transmission (not shown) such that the transfer gear 62 on the front propeller shaft 50 and the internal drum 85 on the rear propeller shaft 50 rotate at the same time.

While rotating, the speed sensors 59 and 69 detect the rotation speeds of the rear and front propeller shaft 50 and 60 and send electrical signals to the electronic controller 90. The controller 90 computes the rotation speeds on the basis of the electrical signals from the speed sensors 59 and 69 and compares the two rotation speeds to each other. If there is a difference between the rear and front propeller shaft 50 and 60 in rotation speed, the controller 90 responsively sends a signal to an actuator 99 of cams 95 such that the cams 95 rotate at a predetermined angle to puch the internal drum 85 of the clutch 80, resulting in engagement of the internal and external drums 85 and 81. Accordingly, the idle gear 52 integrally rotates with the rear propeller shaft 50 causing the rear and front propeller shafts 50 and 60 to rotate at the same rate because they are then connected via the idle gear 52, transfer gear 62 and the chain 70.

That is, the cams 95 rotate at a predetermined angle so as to push the internal drum 81 while overcoming the elastic force of the return spring 88 such that the friction planes 81a and 85a of the external and internal drums 81 and 85 engage with each other. Accordingly, the idle gear 52 is integrated with the clutch 80 such that the rotation forces are interchanged between the idle and the transfer gear 52 and 62 via the chain 70. As a result, the rear and front propeller shafts 50 and 60 rotate at the same speed.

While the rear and front propeller shafts 50 and 60 rotate at the same speed, the controller 90 produces a signal on the basis of the parameters detected by the speed sensor 59 and 69 and sends the signal to the actuator 99 of the cams 95 so as to rotate the cam at a predetermined angle such that the internal drum 85 withdraws to the previous position by the elastic force that the internal drum 85 withdraws to the previous position by the elastic force of the return spring 88, resulting in disengagement of the external and internal drum 81 and 85 of the clutch 80. In this case, the rear and front propeller shafts 50 or 60 independently transfers the rotational torque to the rear or front driving axle (not shown), as applicable.

The torque distribution system according to the second preferred embodiment of the present invention can be utilized with heavy load vehicles requiring great friction forces because the friction planes 81a' and 85a' of the external drum 81 are multiply formed.

As described above, in the torque distribution system of the present invention, the clutch is simply structured with just the inner and outer drums so as to reduce the number of parts of the system assembly as well as the vehicle weight.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A torque distribution system for a four-wheel-drive vehicle comprising:
    front and rear shafts;
    an idle gear mounted on one of said front and rear shafts;
    a transfer gear mounted on the other of said front and rear shafts;
    a chain connecting the idle gear to the transfer gear;
    a clutch comprising, a first drum integrally fixed to and coaxially and laterally extending from the idle gear and having a first circumferential friction plane,
        a second drum slidably mounted on the shaft where the idle gear is mounted and having a second circumferential friction plane such that the second drum selectively slides toward the first drum such that the second circumferential friction plane engages the first circumferential friction plane;
    a first sensor for measuring a rotational speed of the front shaft;
    a second sensor for measuring a rotational speed of the rear shaft; and
    an electronic controller coupled to the first and second sensors for receiving signals from the first and second sensors, the controller controlling movement of the second drum for engaging the first drum in response to said signals.

2. The torque distribution system of claim 1 wherein the first and second circumferential friction planes of the respective first and second drums are mounted on the propeller shaft at a predetermined angle in relation to the propeller shaft.

3. The torque distribution system of claim 1 further comprising a cam coupled to the controller, wherein the cam receives signals from the controller and causes the second drum to engage the first drum.

4. The torque distribution system of claim 3 wherein the clutch further comprises a return spring interposed between the first and second drums for biasing the second drum against the cam.

5. The torque distribution system of claim 3 wherein the controller determines if there is a difference in rotational speed between the two shafts in response to signals received from the two sensors and produces a signal to actuate the cam to engage the two drums if a difference in rotational speed is determined.

6. The torque distribution system of claim 5 further comprising an actuator, wherein the controller controls the actuator for actuating the cam causing the second drum to engage the first drum.

7. The torque distribution system of claim 1 wherein the second drum slides within the first drum.

8. A torque distribution system for a four-wheel-drive vehicle comprising:
    an idle gear mounted on one of a front and rear propeller shaft;
    a transfer gear mounted on the other propeller shaft;
    a chain connecting the idle gear to the transfer gear;
    a clutch coaxially mounted with the idle gear on the propeller shaft where the idle gear is mounted and comprising,
        an external drum integrally fixed to the idle gear and having an inner circumferential friction plane, and
        an internal drum slidably mounted on said one of a front and rear propeller shafts and having an outer circumferential friction plane such that the internal drum selectively slides into and engages with the external drum;
    two speed sensors respectively mounted on the rear and front propeller shafts for detecting rotation speeds of the rear and front propeller shafts;
    a pair of cams contacting the internal drum at the side opposite the external drum for selectively pushing the internal drum toward the external drum, the cams being operated by an actuator; and a controller electrically connected to the speed sensors and the actuator for controlling the cams on the basis of signals from the speed sensors for selectively engaging and disengaging the clutch.

9. The torque distribution system of claim 8 wherein the controller determines if there is a difference in rotational speed between the two shafts in response to the signal received from the two sensors and produces a signal to actuate the cams to engage the two drums if a difference in rotational speed is determined.

* * * * *